Figure 1:
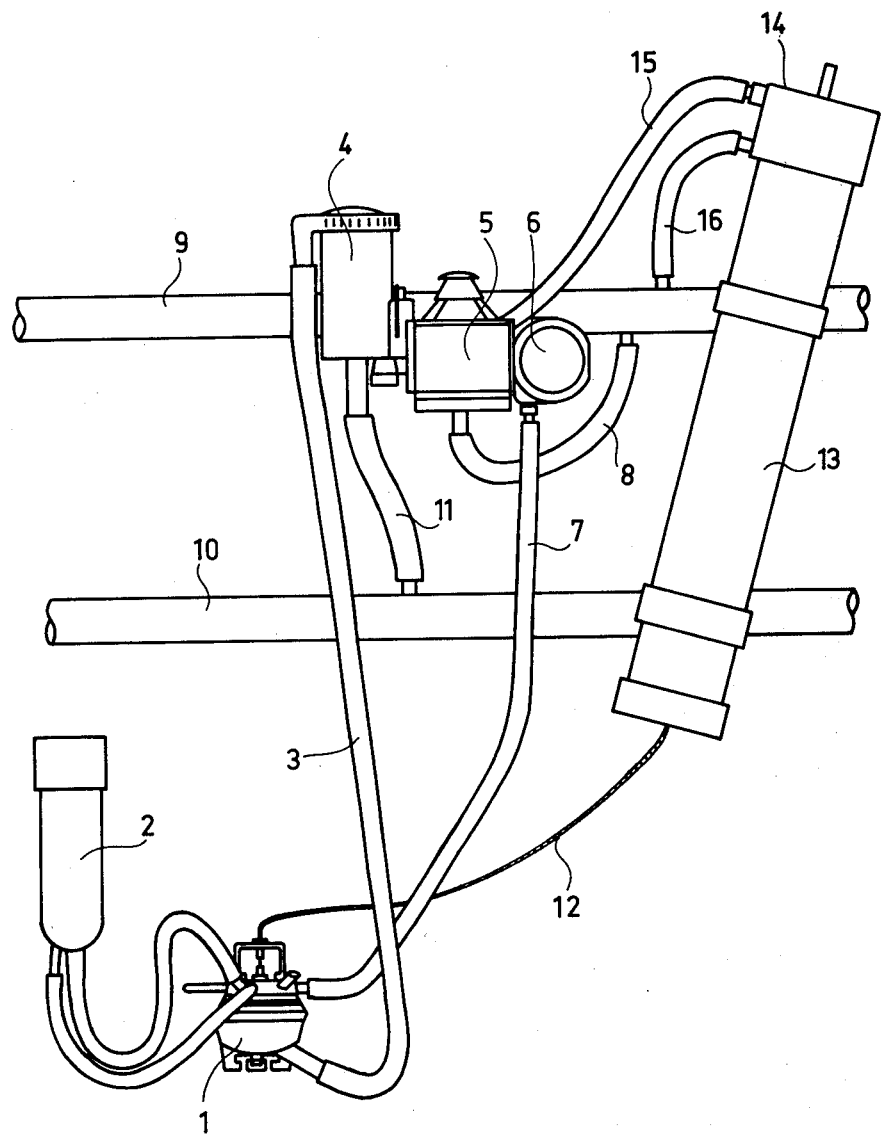

United States Patent [19]

Olander

[11] 4,214,553
[45] Jul. 29, 1980

[54] PNEUMATIC TIME DELAY DEVICE

[75] Inventor: Karl E. Olander, Södertälje, Sweden

[73] Assignee: Alfa-Laval AB, Tumba, Sweden

[21] Appl. No.: 964,182

[22] Filed: Nov. 28, 1978

[30] Foreign Application Priority Data

Dec. 6, 1977 [SE] Sweden .................................. 7713804

[51] Int. Cl.² ............................................. A01J 5/00
[52] U.S. Cl. ................................................. 119/14.08
[58] Field of Search ..................... 119/14.08; 137/510, 137/DIG. 8

[56] References Cited

U.S. PATENT DOCUMENTS

| 3,690,300 | 9/1972 | Tokelli | 119/14.08 |
| 3,931,794 | 1/1976 | Chillingworth | 119/14.08 |
| 4,033,295 | 7/1977 | Soderlund | 119/14.08 |
| 4,126,103 | 11/1978 | Olander | 119/14.08 |

Primary Examiner—Hugh R. Chamblee
Attorney, Agent, or Firm—Cyrus S. Hapgood

[57] ABSTRACT

Apparatus for controlling the operation of a pneumatically actuated device such as a milking machine has two chambers one of which has an adjustable throttle valve in a connection to a vacuum line. The other chamber has a connection to the atmosphere and another connection to the vacuum line. A valve controlled by the pressure in the first chamber controls alternatively the flow through the lines to the second chamber. A signal in a control device of the milking machine connects the vacuum line to the throttle valve connection for the evacuation of the first chamber.

5 Claims, 2 Drawing Figures

PNEUMATIC TIME DELAY DEVICE

The present invention relates to a pneumatically controlled time delay device for a milking machine and more particularly it relates to such a device for controlling the activation of a pneumatic operating gear with a predetermined time delay upon receiving a control impluse.

In machine milking it is common nowadays to control the milking process by signals produced in response to the actual milk flow from the cow. By means of such signals it is possible to control, among other things, the switching between different vacuum levels and different pulse frequencies, or to initiate automatic removal of the milking means from the cow's udder after milking.

For controlling the milking process a flow rate sensor is used which senses the milk flow rate and emits a pneumatic signal when the milk flow rate reaches a predetermined value. Such a device is shown in Swedish Pat. No. 388,995. The pneumatic signal received from such a device can be used for controlling the switching between a first premilking or stimulation phrase and a second normal milking phase.

At the end of the second phase, when the milk flow has decreased to the predetermined value, a second vacuum signal is emitted which can be used for controlling the switching to a third machine stripping or massage phase. It is desirable that the length of the third phase be delimited to a predetermined period of time, and after the lapse of this period, the milking means should be removed from the cow's udder.

When using automatic removal of the milking means, the second vacuum signal can also be used for initiating the removal, provided that the carrying out of the removal is delayed for the above-mentioned period of time. Several delay devices are known for providing this delay, such as electrical or mechanical time relays. In pneumatic milking machines it is desirable for several reasons to avoid such known time relays, especially because they have the drawback of being dependent on other power source than vacuum.

Therefore, it is an object of this invention to provide a delay device for use in a milking machine which operates and is controlled entirely pneumatically.

Another object is to provide such a delay device which ensures an accurately defined time delay period and emits a distinct switching impulse at the end of the time delay period.

A further object is to provide a pneumatic time delay device, the delay period of which is adjustable in a simple way as needed.

According to the invention, the above objects are fulfilled by means of a time delay device of the kind mentioned, generally characterized in that it comprises a housing, a chamber in said housing having a relatively large volume and being connectable to a control vacuum via a throttling valve in order to evacuate the chamber at a relatively slow rate, said rate being adjustable by means of the throttling valve, and a control valve which is adjustable in relation to the pressure in said chamber between a first and a second position in order to connect said operating gear to the atmosphere respectively to a vacuum source, said control valve being adjusted to the second position after a time delay which is adjustable by means of the throttling valve.

The invention will be described in more detail below with reference to the accompanying drawings, in which FIG. 1 illustrates a diagrammatical, partial view of a milking plant embodying a time delay device according to the invention.

Figure 2:
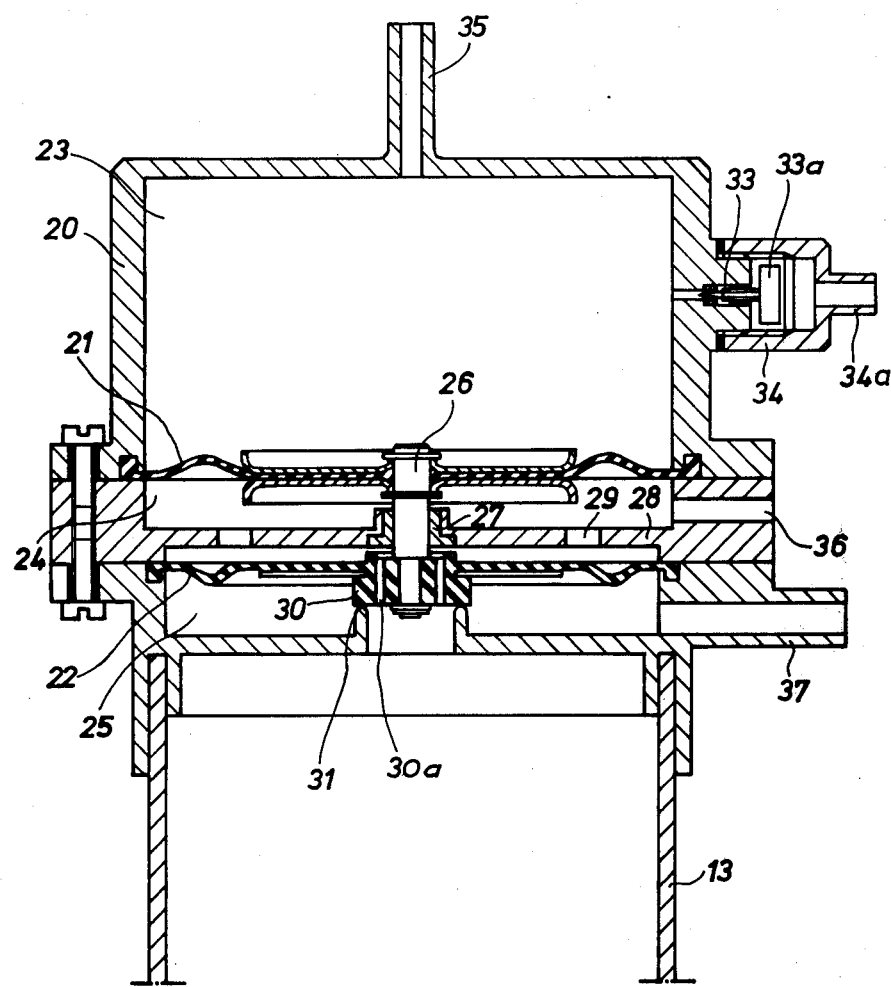

FIG. 2 illustrates a longitudinal section on a larger scale of the time delay device of FIG. 1.

The milking plante shown in FIG. 1 comprises a milk claw 1 with teat cups 2, only one of which is shown. The claw 1 is connected via a milk hose 3 to a milk flow rate sensor 4 which is associated to a control unit 5 and a pulsator 6. The pulsator is connected to the claw 1 by means of a hose 7. The control unit 5 is connected by means of a hose 8 to a vacuum line 9 and the milk outlet of the milk flow rate sensor 4 is connected to a milk line 10 via a hose 11.

The claw 1 is further connected by means of a rope 12 to a cylinder assembly 13 for automatic removal of the milking means after the milking. The rope extends through an opening in the lower end wall of the cylinder and is connected to a piston (not shown) provided in the cylinder. The cylinder 13 is provided at its upper end with a device 14 for delaying the activation of the cylinder assembly, said device being connected by means of hoses 15, 16 to the control unit 5 on the one hand and to the vacuum line 9 on the other hand.

As appears from FIG. 2, the time delay device 14 shown therein comprises a housing 20, the interior of which is divided into three separate chambers by means of an upper and a lower membrane 21 and 22, respectively, viz. an upper chamber 23 situated above the upper membrane 21, a chamber 24 situated between the two membranes, and a lower chamber 25 situated below the lower membrane 22. The upper chamber 23 has a larger diameter than the lower chamber 25 for reasons that will be explained below.

Both membranes 21, 22 are secured in the housing at their periphery and they are each fastened at their center to one end of an axially movable bar 26 which is coaxial with the cylinder 13. The bar 26 is guided in a bushing 27 which is mounted in a wall 28 connected to the housing 20 and provided with openings 29. The lower membrane 22 is connected to a valve means 30 which cooperates with a valve seat 31 in order to control the connection between the lower chamber 25 and the interior of the cylinder 13. The valve means 30 is further provided with axial openings 30a.

The upper chamber 23 is connected to the control unit 5 (FIG. 1) via a needle valve 33, the position of which is adjustable by means of a hand wheel 33a. The valve 33 is hermetically enclosed from the atmosphere by means of a removable cover 34 which is threadedly secured to the housing 20 in sealing relationship therewith and is connected by means of a nipple 34a to the hose 15. The chamber 23 is further connected via a nipple 35 to a manually actuatable valve (not shown) by means of which this chamber can be connected to the atmosphere. The intermediate chamber 24 is constantly connected to the atmosphere via an opening 36 and the lower chamber 25 is connected via a nipple 37 and the hose 16 to the vacuum line 9 and is thus constantly exposed to vacuum.

In the position shown in FIG. 2 the valve means 30 seals against the seat 31, whereby the lower chamber 25 is shut off from the cylinder 13. The cylinder 13 is instead connected to the atmosphere via the openings 30a, 29 and 36, and consequently, atmospheric pressure is prevailing in the cylinder. The valve means 30 is held in the shown position by the downward directed force acting on the lower membrane 22 due to the fact that the chamber 25 is under vacuum.

When a signal for activating the cylinder 13 is received from the flow rate sensor 4, the upper chamber 23 is connected to vacuum via the control unit 5, the hose 15 and the needle valve 33. Since the chamber 23 has a relatively large volume and the flow of air passing outwards is throttled by the valve 33, the evacuation take place only slowly. However, after a predetermined time, e.g. 30 seconds, which is adjusted by means of the hand wheel 33a, when the vacuum in the chamber approaches the same level as the vacuum in lower chamber 25, the upward directed force acting on the upper membrane 21 will overcome the downward directed force acting on the lower membrane 22, since the upper membrane has a larger effective area than the lower one.

The upward directed force is transmitted via the bar 26 to the valve means 30 which is removed from the seat 31 and moves upwards until engaging and sealing against the lower side of the bushing 27. The connection between the interior of the cylinder 13 and the atmosphere via the openings 30a and the chamber 24 is thereby closed, at the same time as the interior of the cylinder is connected to the lower chamber 25. Since this chamber 13 is constantly connected to the vacuum line 9, the cylinder will be rapidly evacuated, whereby the piston therein (not shown) to which the rope 12 is connected, is actuated to move upwards in order to remove the milking means from the cow's udder.

By proper adjustment of the needle valve 33 it has proved to be possible to control the time of delay with great accuracy up to about 2 minutes.

When the device should be rapidly reset to the position shown in FIG. 2, as is the case at the beginning of the milking process, when the milking means are to be placed on the cow's udder, the chamber 23 is connected to the atmosphere for a few seconds via the nipple 35 and the mentioned valve which is not shown. The vacuum in the chamber 23 will then be rapidly neutralized and the valve means 30 returns to the shown lower position actuated by the vacuum in the chamber 25 acting on the lower membrane 22. Atmospheric air is thereby allowed to flow into the cylinder 13 via the openings 32, the vacuum in the cylinder being rapidly neutralized, whereby the piston therein can easily be returned to its lower position by pulling out the rope 12.

The invention is described in connection with automatic milking apparatus, but it will be understood that it may be useful in other combinations wherein a pneumatically actuated device is to be operated for activation of other machines or apparatus.

Modifications will occur to those skilled in the art. Therefore, the invention is not limited to the specific embodiment shown and described.

I claim:

1. Apparatus for controlling the operation of a pneumatically activated device, comprising means forming first and second closed chambers, a vacuum source connected to said second chamber, means connecting said second chamber to said pneumatically activated device, valve means associated with said second chamber and having a first position for preventing access of the pneumatically actuated device to said vacuum source while connecting said device to atmosphere, said valve means having a second position for permitting access of the pneumatically actuated device to said vacuum source while disconnecting said device from atmosphere, an adjustable throttling valve, and a control unit connected to said first chamber and operable to draw air therefrom through said throttling valve to reduce the pressure in the first chamber, after a time delay, sufficiently to move said valve means from its first position to its second position, the extent of said time delay being adjustable by adjustment of said throttling valve.

2. The apparatus of claim 1, in which said chamber-forming means include diaphragm means separating said two chambers from each other and to which said valve means are connected.

3. The apparatus of claim 1, comprising also a valve seat, said valve means including a valve member having an opening therethrough, the pneumatically actuated device being connected to atmosphere through said opening in the first position of said valve means, said valve member engaging said seat to close said opening in the second position of the valve means.

4. The apparatus of claim 2, in which said diaphragm means include two diaphragms defining between them a third chamber connected to atmosphere, one of said diaphragms being operable from said vacuum source to hold the valve means in its first position, the other diaphragm being operable by sufficient vacuum in said first chamber, after said time delay, to move the valve means to its second position.

5. The apparatus of claim 2, in which said diaphragm means include two diaphragms defining between them a third chamber connected to atmosphere, one of said diaphragms being operable from said vacuum source to hold the valve means in its first position, the other diaphragm being operable by sufficient vacuum in said first chamber, after said time delay, to move the valve means to its second position, the apparatus comprising also a first valve seat located in said third chamber, said means connecting the second chamber to the pneumatically actuated device including a second valve seat, said valve means including a valve member having an opening and which, in said first position of the valve means, covers said second seat to block communication between the second chamber and said device while connecting said device through said opening to said third chamber, said valve member in the second position of the valve means engaging said first seat to close said opening while uncovering said second seat.

* * * * *